United States Patent [19]

Takebayashi et al.

[11] Patent Number: 5,450,412
[45] Date of Patent: Sep. 12, 1995

[54] ISDN INTERFACE UNIT

[75] Inventors: Tomoyoshi Takebayashi; Toshihiro Azami; Ryuichi Matsukura; Hiroki Hasegawa; Satoshi Okuyama, all of Kawasaki, Japan

[73] Assignee: Fujitsu Limited, Kawasaki, Japan

[21] Appl. No.: 799,161

[22] Filed: Nov. 27, 1991

[30] Foreign Application Priority Data

Nov. 29, 1990 [JP] Japan .................................. 2-332111
Dec. 18, 1990 [JP] Japan .................................. 2-411545

[51] Int. Cl.$^6$ ........................................... H04M 11/06
[52] U.S. Cl. ................................. 370/95.1; 370/110.1; 395/309; 395/842
[58] Field of Search ............... 370/53, 93, 110.1, 111, 370/119; 375/7, 25; 379/93, 94, 97, 98; 395/154, 425

[56] References Cited

U.S. PATENT DOCUMENTS

| | | | |
|---|---|---|---|
| 4,981,371 | 1/1991 | Gurak et al. | 370/110.1 |
| 5,023,868 | 6/1991 | Davidson | 370/110.1 |
| 5,042,028 | 8/1991 | Ogawa | 370/110.1 |
| 5,067,125 | 11/1991 | Tsuchida | 370/79 |
| 5,124,985 | 6/1992 | Hoshikawa | 370/95.1 |
| 5,204,860 | 4/1993 | Sparks | 370/110.1 |
| 5,267,245 | 11/1993 | Maruyama et al. | 370/109 |

FOREIGN PATENT DOCUMENTS

| | | |
|---|---|---|
| 0357427 | 3/1990 | European Pat. Off. . |
| 0409622 | 1/1991 | European Pat. Off. . |
| 91/01600 | 2/1991 | WIPO . |

OTHER PUBLICATIONS

Patent Abstracts of Japan, vol. 010, No. 137 (E–405) May 21, 1986 & JP-A-61 001 156 (Nippon Denki) Jan. 7, 1986, Abstract.
L. Winkler et al., "Nachrichten Technik Elektronik", *ISDN-Terminaladapter A/B: Konzept und Realisierung*, vol. 39, No. 11, 1989, Berlin, DD, pp. 428–430, XP83441.
M. Leonard, "Development Tools Rally Around ISDN ICs", *Electronic Design*, vol. 38, No. 8, Apr. 1990, Hasbrouck Heights, N.J., pp. 61–66, XP125945.
*Patent Abstracts of Japan*, vol. 16, No. 138 (E–1186) Apr. 7, 1992 & JP-A-32 97 259 (Ricoh) Dec. 27, 1991, Abstract.
Harl et al., *Commutation et Transmission*, pp. 55–66, vol. 11, No. 4 1989.
David, *Proceedings of the Ninth International Conference on Computer Communication* 30, pp. 175–180, Oct. 1988.
Gullick et al., *Electronica*, pp. 21–37, vol. 36 No. 22, Nov. 1988.

*Primary Examiner*—Benedict V. Safourek
*Attorney, Agent, or Firm*—Staas & Halsey

[57] ABSTRACT

An ISDN interface unit interconnects a data processing unit, an ISDN, and an analog telephone and includes a DMA request signal generation circuit for generating a DMA request signal from an 8 kHz clock signal from an ISDN line. In accordance with the request signal, PCM coded data input from the ISDN line is transferred, using DMA, to a memory of the data processing unit or vice versa, or the ISDN interface unit includes a code conversion circuit, data stored in the data processing unit are converted to nonlinear PCM coded data and transmitted to the ISDN line or vice versa. Further, the ISDN interface unit includes communication functions for the digital signal and for the voice band signal, a control channel signal sent from the ISDN line is interpreted, and one of the communication functions can be selected.

2 Claims, 6 Drawing Sheets

ISDN INTERFACE UNIT

BACKGROUND OF THE INVENTION

1. Field of the Invention

The present invention relates to an ISDN (Integrated-Services Digital Network) interface unit mounted on a data processing unit e.g., a personal computer or the like, for processing an interface between an ISDN line and the data processing unit, and particularly to an ISDN interface unit using a higher grade service that can be provided without depending on a communication partner's ISDN progress or communication speed, and also relates to an ISDN interface unit using a connected analog telephone that can ring.

2. Description of the Related Art

It is advantageous for a communication terminal to execute a multi-media communication service to which an ISDN high speed communication or a plurality of channel functions is applied, using an existing personal computer. In this regard, although the ISDN can provide a high grade communication service, since the connecting sequence is complicated compared with a conventional telephone network, the interface circuit connecting between the personal computer and the ISDN is necessary. As an interface circuit, there is a terminal adaptor and an ISDN interface unit. The terminal adaptor is provided with a module corresponding to a modem in a conventional analog line, it is connected to an RS232C port (American National Standards Institute) in the personal computer or the like, and a data communication through the ISDN is realized. On the other hand or alternatively, the ISDN interface unit may be mounted in an option slot in the personal computer, and a physical connection to the ISDN or a connecting sequence to the ISDN exchange is realized.

The purpose of the conventional ISDN interface unit is to form a combination of the information processing of the personal computer and the digital information communication, and generally it has both the ISDN connecting function and the data communication function e.g., data link control function or the like. Further, by controlling the connecting sequence from the personal computer, it is constituted or constructed such that a higher grade telephone service can be realized. By providing an audio apparatus for the telephone (e.g., handset or the like) service hereinafter, some of the conventional ISDN interface units are constituted to provide a voice communication service.

In the conventional ISDN interface unit, however, as a first problem, the data communication service and the voice communication service are treated independently, and storage into the personal computer of the digital voice signal from the line and the transmission of the voice data in the personal computer to the line, cannot be carried out. Accordingly, in the conventional ISDN interface unit, for example, storage of the digital voice signal in the personal computer, the playback of the stored digital voice signal by the PCM (Pulse Code Modulation) sound source, and reuse of the voice data, cannot be executed, because of the different coding between the voice data by the PCM sound used in the personal computer and the voice data used in the ISDN line.

In addition, as a second problem, in the conventional ISDN interface unit, only digital communication is realized and data communication in the voice band signal is not supported. For example, in the terminal adaptor, the conversion from the digital signal (e.g., speed of 9600 bps) of the standard of the RS232C to the digital signal series of the ISDN 64 kbps is realized. The conversion realizes the V.110 standard standardized by CCITT. Some of the conventional ISDN interface units are provided with the above rate adaptation function. In the conventional ISDN interface unit, however, in this case, the conversion to the voice band signal realized by the modem cannot be executed. Namely, only digital data communication is realized, and data communication in the voice band signal is not supported. Therefore, by using the conventional ISDN interface unit, communication to the network information service center or the like connected to the existing analog network cannot be carried out.

Further, as another problem in the conventional example, in order to produce the ring of an analog telephone, a high voltage and low frequency signal of 75 Vrms and 16 Hz is necessary. In the conventional telephone network, the ring is generated in the telephone exchange station.

When the analog telephone is connected to the ISDN, which does not generate a ring, hitherto, there arises a problem in that the analog telephone cannot produce the ring.

As one method for the above problem, it is considered that the ISDN interface unit connected to the analog telephone, and processing the interface process to the ISDN, provides a ring signal generator generating a ring signal. However, the ring signal generator generating a ring signal having a high voltage and low frequency, such as 75 Vrms and 16 Hz, must be very large. On the other hand, the above-mentioned ISDN interface unit requires a small size to realize the various functions, for example, the extended board in the personal computer. Accordingly, in fact, the above scale cannot be used.

SUMMARY OF THE INVENTION

An object of the present invention is to provide an ISDN interface unit that can provide a higher grade service in accordance with the ISDN progress of a communication partner.

Further, another object of the present invention is to provide a small ISDN interface unit that can ring an analog telephone connected to the ISDN.

According to a first aspect of the present invention, there is provided an ISDN interface unit mounted on a data processing unit for processing an interface process between the data processing unit and an ISDN line, where the ISDN interface unit includes a DMA (Direct Memory Access) request signal generation circuit for generating a DMA request signal from an 8 kHz clock signal obtained from the ISDN line; a PCM coded data input from the ISDN line is transferred, using the DMA circuit, to a memory of the data processing unit, or PCM coded data stored in the memory of the data processing unit is transferred, using the DMA, to the ISDN line in accordance with the DMA request signal.

According to a second aspect of the present invention, there is provided an ISDN interface unit mounted on a data processing unit for processing an interface process between the data processing unit and an ISDN line, where the ISDN interface unit includes a code conversion circuit for converting between codes of a coded nonlinear PCM code used in the ISDN line, and a coded linear PCM code used in the data processing unit; data stored in the data processing unit are converted to nonlinear PCM coded data in accordance with the conversion of the code conversion circuit and are transmitted to the ISDN line; the nonlinear PCM coded data sent from the ISDN line are converted to the linear PCM coded data, and are stored in the data processing unit.

According to a third aspect of the present invention, there is provided an ISDN interface unit mounted on a data processing unit for processing an interface process between the data processing unit and an ISDN line, where the ISDN interface unit includes a code conversion circuit for converting between codes of a coded nonlinear PCM code used in the ISDN line, and a coded linear PCM code used in the data processing unit, and an additional circuit for adding a voice signal output to the ISDN line, or nonlinear PCM coded data of voice signal input from the ISDN line, and nonlinear PCM coded data output from the code conversion circuit; the voice signal is combined with stored data in the data processing unit in accordance with the additional process of the addition circuit, and the combined data are output to the ISDN line or an analog telephone.

According to a fourth aspect of the present invention, there is provided an ISDN interface unit mounted on a data processing unit for processing an interface process between the data processing unit and an ISDN line, where the ISDN interface unit includes a digital signal communication circuit and a voice band signal communication circuit and one of said communication circuits can be selected by interpreting or utilizing a control channel signal given from the ISDN line. As a first step, the transmission is carried out to match the digital signal communication circuit and when a response from a communication partner is received, the communication is carried out by using the digital signal communication circuit. In addition, when a disconnect message is received instead of a response, as a second step, a retransmission is automatically carried out to match the voice band signal communication circuit.

According to a fifth aspect of the present invention, there is provided an ISDN interface unit for processing an interface process to an ISDN and to an analog telephone, where the ISDN interface unit includes a ring signal controller for supplying a control signal to designate or establish the generation of a ring of the analog telephone through a modular jack connecting the analog telephone when a connection is designated to the analog telephone from the ISDN; a ring signal generator for generating a ring signal to obtain the ring of the analog telephone corresponding to the ISDN interface unit; a switch means for selecting one of the ring signals generated by the ring signal generator and a voice signal output through the modular jack and for supplying the selected signal to the analog telephone. In addition the switch means supplies the ring signal generated by the ring signal generator to the analog telephone when the ring signal controller outputs the control signal.

According to a sixth aspect of the present invention, there is provided an ISDN interface unit for processing an interface process to an ISDN and to an analog telephone, where the ISDN interface unit includes a ring signal controller for supplying a control signal to designate the generation of a ring of the analog telephone through a modular jack connecting the analog telephone when a connection is designated to the analog telephone from the ISDN, and a sounder for generating a ring of the analog telephone corresponding to the ISDN interface unit. The sounder generates the ring when the ring signal controller outputs the control signal.

Other features and advantages of the invention will be apparent from the following description given with reference to the accompanying drawings.

DESCRIPTION OF THE PREFERRED EMBODIMENTS

Figure 1:
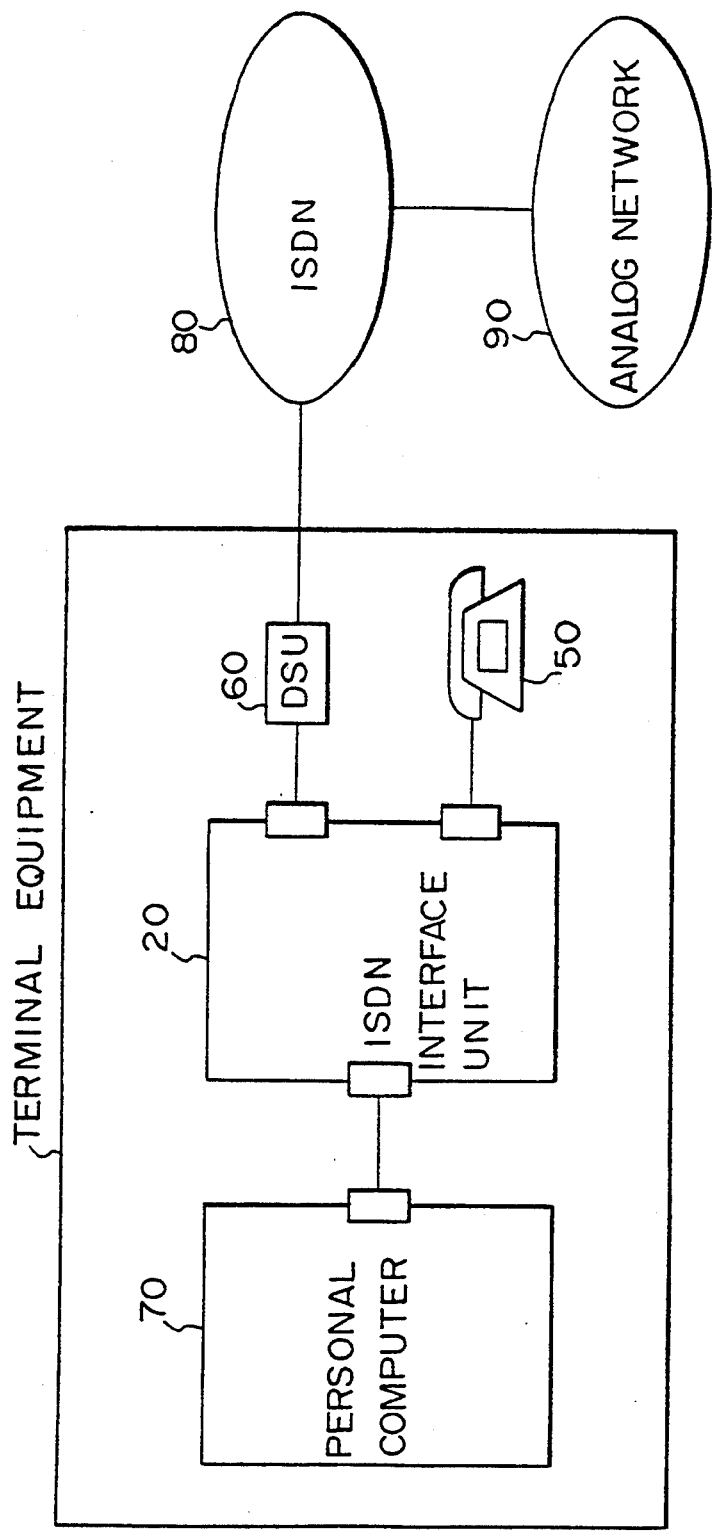
FIG. 1 is an explanatory block diagram of a communication processing system to which this invention is applied.

In FIG. 1, a block diagram of a communication processing system to which this invention is applied is shown. As shown in the figure, an ISDN interface unit 20 according to the invention executes an interface process between a personal computer 70 and an ISDN 80 and, for example, an analog telephone 50 or the like is connected thereto. The ISDN 80 is combined with an existing analog network 90 until completely converted to the ISDN 80. In FIG. 1, a reference numeral 60 denotes the DSU (Digital Service Unit).

Below, a first embodiment of this invention is explained with reference to FIG. 2.

Figure 2:
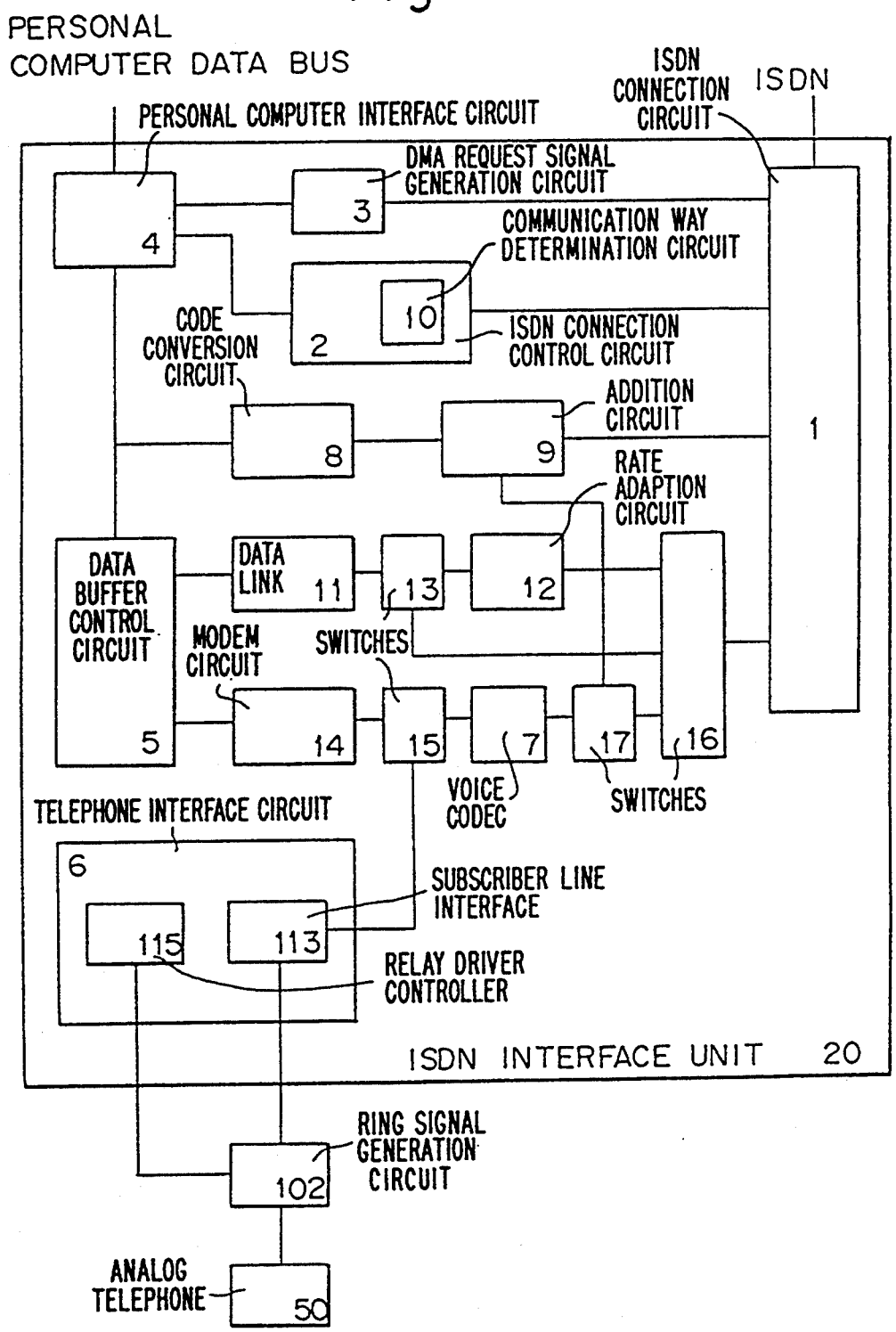
FIG. 2 is a block diagram of an ISDN interface unit according to a first embodiment of the invention.

In FIG. 2, 1 denotes an ISDN connection circuit corresponding to a first OSI (Open Systems Interconnection) model layer, and it constitutes a physical interface in the connection to the ISDN line. The ISDN connection circuit 1 outputs a control channel signal (D channel signal) for connecting the ISDN line and a 64 kbps information channel signal (B channel signal) that includes a voice signal and data information when the ISDN connection circuit 1 receives a digital signal from the ISDN line. 2 denotes an ISDN connection control circuit corresponding to OSI model layer 2 and 3. The ISDN connection control circuit 2 executes an extraction and an interpretation of the ISDN connection control message from the control channel signal separated by the ISDN connection circuit 1. 3 denotes a DMA request signal generation circuit for generating the DMA request signal from an 8 kHz clock signal for the voice signal obtained from the ISDN line.

4 denotes a personal computer interface circuit that executes an interface process to the personal computer connected to the ISDN interface unit, and provides it with a DMA control interface. 6 denotes a telephone interface circuit that executes an interface process to the analog telephone connected to the ISDN interface unit. 7 denotes a voice codec, which converts an analog signal to a nonlinear PCM code digital signal or vice versa. 8 denotes a code conversion circuit, which converts the nonlinear PCM code digital signal to a linear PCM code digital signal or vide versa. The code conversion circuit 8 sometimes does not convert the signal and outputs the input data as it is. 9 denotes an addition circuit, which adds nonlinear PCM coded data of a voice signal and nonlinear PCM coded data from the code conversion circuit 8. One of the voice signals added by the addition circuit 9 is supplied from the ISDN line and the other voice signal is supplied to the ISDN line. Further, the addition circuit 9 sometimes does not add and outputs the input data as it is.

5 denotes a data buffer circuit, which stores data to supply the ISDN line or data supplied from the ISDN line. 10 denotes a communication way determination circuit included in the ISDN connection control circuit 2 which determines the communication way that belongs to a communication partner by interpreting the control channel signal given or received from the ISDN line. 11 denotes a data link control circuit which connects linked data to the communication partner, for example, by executing a sequence of HDLC (High-level Data Link Control Procedures). 12 denotes a rate adaptation circuit which converts the data having communication speed used in the conventional personal computer communication to 64 kbps, which is a communication speed in the ISDN line, or vice versa. 13 denotes a first switch that bypasses the rate adaptation circuit 12. 14 denotes a modem circuit that converts an analog signal to a digital signal, or vice versa. 15 denotes a second switch that selects either the telephone interface 6 or the modem circuit 14. 16 denotes a third switch that selects either the voice codec 7, the rate adaptation circuit 12 or the first switch. 17 denotes a fourth switch that selects the input signal for the voice codec 7 from the outputs of the third switch 16 and the addition circuit 9.

When the ISDN connection control circuit 2 detects the reception of the voice signal from the ISDN line in accordance with the control channel signal, the DMA request signal generation circuit 3 generates and supplies the DMA request signal to the personal computer interface circuit 4. When the personal computer interface circuit 4 receives the DMA request signal, it transfers, using DMA, the nonlinear PCM code voice signal separated by the ISDN connection circuit 1 and passing through the addition circuit 9 and the code conversion circuit 8, as is, to the personal computer.

As mentioned above, the digital voice signal from the ISDN line can bestored in the personal computer. The voice signal does not have a packet structure different from the data information, therefore, the voice signal is directly transferred, using DMA, in the personal computer, the digital voice signal from the ISDN line is stored in the personal computer at high speed, and afterward, that the data can be stored at an optimum condition for the personal computer, as a PCM voice signal source.

In this first embodiment, if the output of the stored data of the personal computer to the ISDN line is requested, since the personal computer interface circuit 4 transfers the data to the code conversion circuit 8 in accordance with the DMA request signal when the transferred data is the linear PCM code, the code conversion circuit 8 converts the data to the nonlinear PCM code data. Then, the ISDN connection circuit 1 sends the nonlinear PCM code data that passes through the addition circuit 9, to the ISDN line. On the other hand, when the nonlinear PCM code data stored in the personal computer from the ISDN line is sent, the code conversion circuit 8 converts the nonlinear PCM code data that passes through the addition circuit 9 as it is, to the linear PCM code data, and the personal computer interface circuit 4 transfers, using DMA, the data to the personal computer.

As mentioned above, the linear PCM coded data usually used in the personal computer can be sent to the ISDN line, and the voice data sent from the ISDN line can be utilized again in the personal computer as linear PCM coded data.

In this first embodiment, when a combination of the voice signal stored in the personal computer and the voice signal output from the analog telephone 50 and an output to the ISDN line are requested, the code conversion circuit 8 converts the voice signal formed by the linear PCM code in the personal computer, into the nonlinear PCM code; the addition circuit 9 adds the converted nonlinear PCM code voice signal, together with the voice signal sent through the voice codec 7 from the analog telephone. Then, the ISDN connection circuit 1 sends the added nonlinear PCM code voice signal to the ISDN line. While, if the combination of the voice signal stored in the personal computer and the voice signal sent from the ISDN line and the output to the analog telephone are requested, the code conversion circuit 8 converts the voice signal in the personal computer, which is formed by the linear PCM code, to the nonlinear PCM code, and the addition circuit 9 adds the converted nonlinear PCM code voice signal together with the voice signal sent from the ISDN line. Then, the voice codec 7 converts the voice signal to the analog signal, and the telephone interface circuit 6 outputs the converted voice signal to the analog telephone.

By using the above embodiment, for example, music stored in the personal computer becomes background music, and the voice signal can be sent to the ISDN line. Also, for example, the music stored in the personal computer becomes background music, and the voice signal for the analog telephone can output the same as main music.

Below, in the first embodiment, the explanation regarding the fourth aspect of the invention is described.

First, according to the designation from the personal computer, the ISDN interface unit starts to communicate to the communication partner using the digital communication circuit. At that time, a bearer capability in a setup message in a layer 3 message sent to the ISDN line is designated as 64 kbps nonlimited digital data. If the communication partner has a digital communication circuit, a response message is returned through the ISDN line and the communication starts. On the other hand, if the communication partner does not have the digital communication circuit, a disconnect message is returned. In this case, the setup message, having the bearer capability of 3.4 kHz, is immediately transmitted again. When the above communication process is executed, since the ISDN interface unit provides at least the data link control circuit 11 and the rate adaptation circuit 12 as a digital signal communication circuit, and at least the modem circuit 14 and the voice codec 7 as a voice band signal communication circuit, the high grade communication process to the communication terminal connected to the existing analog network can be executed without limiting the ISDN. In addition, wherein the personal computer selects and processes regarding the communication circuit is explained, however, the CPU (Central Processing Unit) of the ISDN interface unit may also process and select regarding the communication circuit. By using this embodiment, during the progress term or processing luration of the ISDN, the communication for the existing analog network can be performed in accordance with a higher grade communication process.

Figure 3:
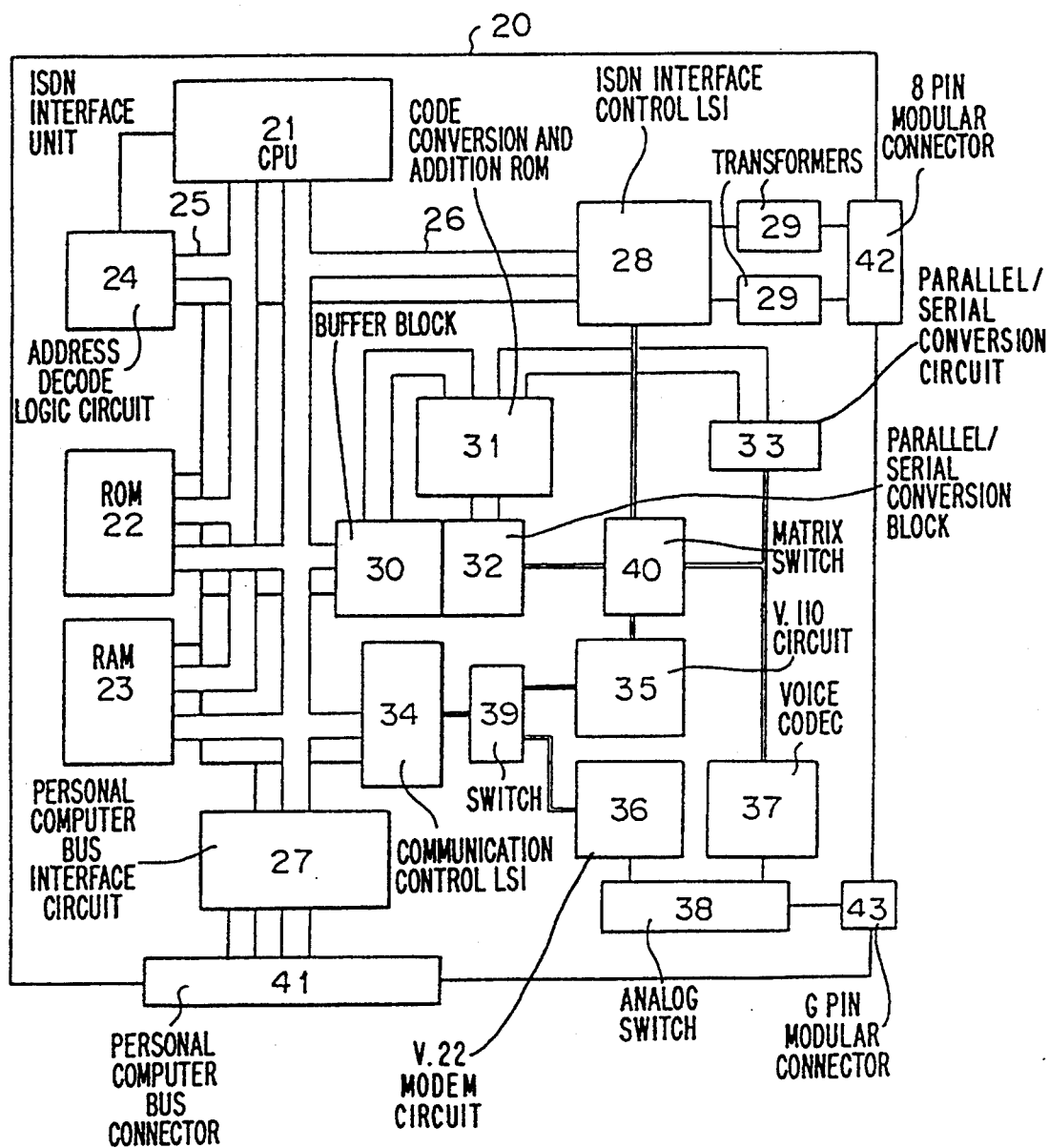
FIG. 3 is a detailed block diagram of the ISDN interface unit of FIG. 2.

In FIG. 3, the detailed circuit constitution of the ISDN interface unit according to the first embodiment is shown. In the figure, 21 denotes a CPU, 22 denotes a ROM (Read Only Memory), 23 denotes a RAM (Random Access Memory), 24 denotes an address decode logic circuit, 25 denotes an address bus, 26 denotes a data bus, 27 denotes a personal computer bus interface circuit, 28 denotes an ISDN interface control LSI (Large-scale Integrated Circuit), 29 denotes a transformer, 30 denotes a buffer block, 31 denotes a code conversion and addition ROM, 32 denotes a parallel/serial conversion block, 33 denotes a parallel/serial conversion circuit, 34 denotes a communication control LSI, 35 denotes a V.110 circuit, 36 denotes a V.22 modem circuit, 37 denotes a voice codec, 38 denotes an analog switch, 39 denotes a switch, 40 denotes a matrix switch, 41 denotes a personal computer bus connector, 42 denotes an 8 pin modular connector, and 43 denotes a 6 pin modular connector.

The personal computer bus interface circuit 27 realizes the personal computer interface circuit 4 in FIG. 2. The ISDN interface control LSI 28 realizes the ISDN connection circuit 1 and the ISDN connection control circuit 2 in FIG. 2, and the buffer block 30 realizes the data buffer circuit 5 in FIG. 2. The code conversion and addition ROM 31 converts the linear PCM code voice signal to the nonlinear PCM code voice signal, and adds the converted nonlinear PCM code voice signal and the nonlinear PCM code voice signal output from the voice codec 37. The communication control LSI 34 executes a communication control process and realizes the data link control circuit 11 in FIG. 2. The V.110 circuit 35 corresponds to the rate adaptation circuit 12 explained in FIG. 2 and executes the rate adaptation process in V.110 protocol in the CCIT recommendation. The V.22 modem circuit 36 corresponds to the modem circuit 14 in FIG. 2, and executes the modem process in V.22 protocol of the CCIT recommendation. The voice codec 37 realizes the voice codec 7 in FIG. 2, and the matrix switch 40 executes a switching of the circuit selection used in the communication process. The personal computer bus connector 41 connects to the personal computer 70 in FIG. 1, the 8 pin modular connector 42 connects to the DSU 60 in FIG. 1, and the 6 pin modular connector 43 connects to the analog telephone 50 in FIG. 1.

Figure 4:
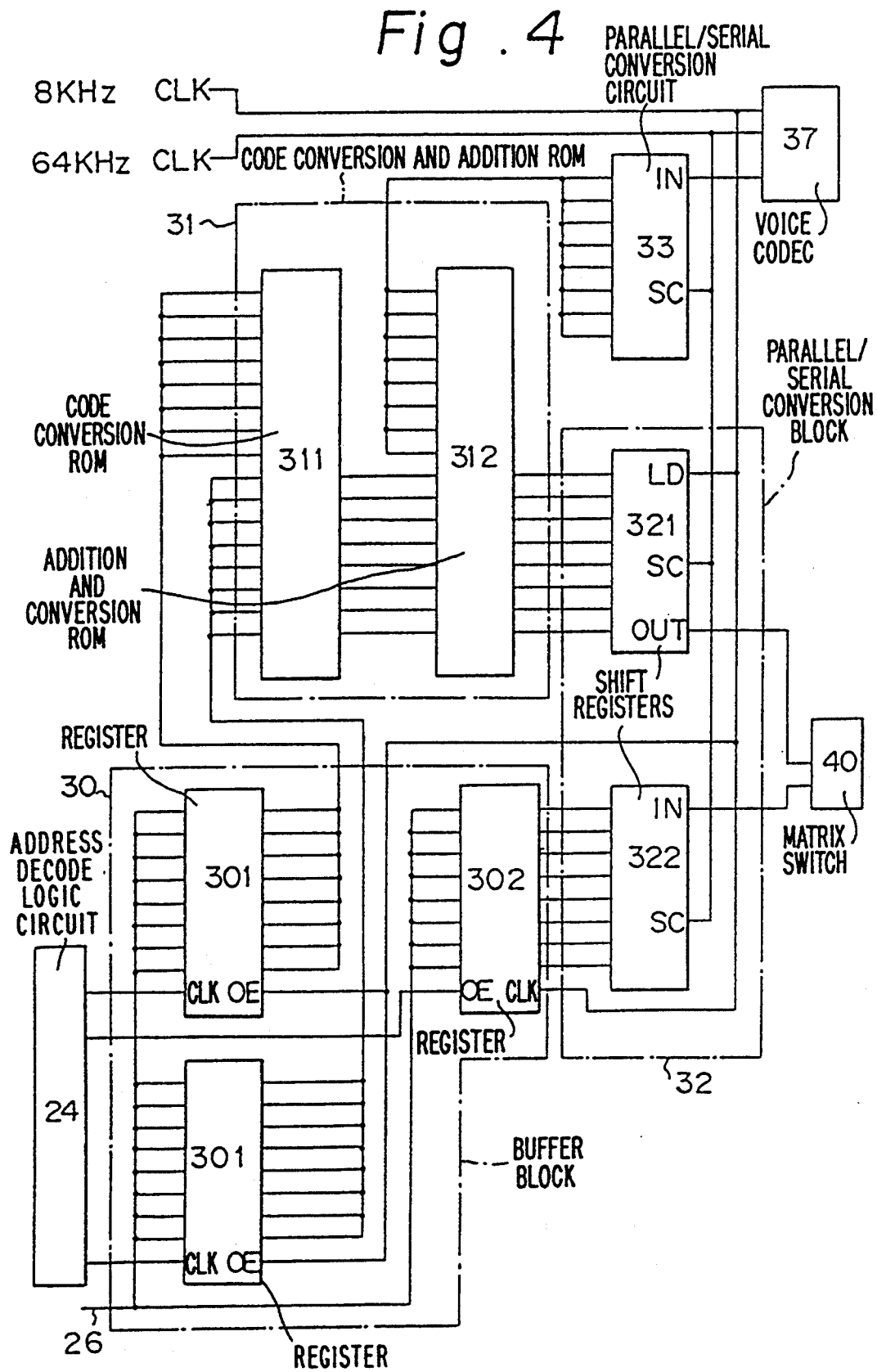
FIG. 4 is a partial detailed block diagram of the ISDN interface unit of FIG. 3.

In FIG. 4, the details of the buffer block 30, the code conversion and addition ROM 31, and the parallel/serial conversion block 32 are shown. In FIG. 4, the elements explained in FIG. 3 are shown by the same reference numerals. The parallel/serial conversion circuit 33 shown in FIG. 3 consists of a shift register as shown in FIG. 4, and receives serial data from the voice codec 37 as an input, and the input data is shifted synchronizing with a 64 kHz clock signal and converted to 8 bit parallel data.

As shown in FIG. 4, the buffer block 30 comprises a 16 bits register 301 for latching the linear PCM coded data from the personal computer 70 input through an inner bus and a register 302 which latches the data (nonlinear PCM coded data or linear PCM coded data) output to the personal computer 70 synchronized with an 8 kHz signal and outputs the data to the personal computer 70 through the data bus 26. The code conversion and addition ROM 31 comprises a code conversion ROM 311 that converts 16 bit linear PCM coded data from the register 301 to nonlinear PCM coded data and obtains an 8 bit voice signal, and an addition and conversion ROM 312 that adds a nonlinear PCM code voice signal from the voice codec 37 through the parallel/serial conversion circuit 33 and nonlinear PCM code voice signal from the code conversion ROM 311. The parallel/serial conversion block 32 comprises a shift register 321 that is loaded with nonlinear PCM coded data from the addition and conversion ROM 312 synchronized with an 8 kHz clock and outputs to the matrix switch 40 as serial data synchronized with a 64 kHz clock, and a shift register 322 that shifts the voice signal or the like input through the matrix switch 40 synchronized with a 64 kHz clock, executes the conversion to 8 bit parallel data, and supplies the data to the register 302.

Below, operations of this embodiment are explained. First, the process when the data from the ISDN line are stored in the personal computer 70 is explained.

When the data (linear PCM coded data or nonlinear PCM coded data) from the ISDN line are stored in the personal computer 70, the matrix switch 40 supplies the data given from the ISDN line through the ISDN interface control LSI 28 to the shift register 322 in the parallel/serial conversions block 32, and the shift register 322 supplies the input data to the register 302 in the buffer block 30. In this process, when the data from the ISDN line is the nonlinear PCM code voice signal, since the voice signal does not have header information different from the data information, if the voice signal is transferred, using DMA, to the personal computer 70 as is, the voice signal can be stored as data having a size within the memory capacity limit of the personal computer 70.

In this embodiment, only the code conversion ROM 311, which converts the linear PCM coded data to the nonlinear PCM coded data, is disclosed or discussed here. However, even though the code conversion ROM executing the reverse conversion is provided, for the sake of brevity, this reverse conversion will not be discussed. In accordance with the code conversion ROM 311, the nonlinear PCM coded data from the ISDN line is converted to the linear PCM coded data, and the converted linear PCM coded data can be transferred to the personal computer 70. As a result, the converted coded data may not be converted by the personal computer 70.

Next, the process of combination of the voice signal stored in the personal computer 70 and the voice signal from the analog telephone 50, and the process of outputting the combined signal to the ISDN line are explained.

When the voice signals are combined, the register 301 latches the linear PCM code voice signal stored in the personal computer 70, and the code conversion ROM 311 converts the voice signal to the nonlinear PCM coded data. Accordingly, the addition and conversion ROM 312 adds the nonlinear PCM code voice signal from the voice codec 37 through the parallel/serial conversion circuit 33 and the nonlinear PCM code voice signal from the code conversion ROM 311, and the shift register 321 converts the added nonlinear PCM code voice signal to the serial data. Then, the matrix switch 40 outputs the combined voice signal of the nonlinear PCM code of the serial data through data bus 26 to the ISDN interface control LSI 28 shown in FIG. 3. By this combination of the voice signal, various services such as background music stored in the personal computer 70, and voice signals from the analog telephone 50 supplied mainly to the ISDN line are provided.

In this first embodiment, the additional object of the addition and conversion ROM 312 is that the nonlinear PCM code voice signal generated from the analog telephone 50, and the matrix switch 40, outputs the added voice signal to the ISDN line. Although the above disclosure is performed, the additional object of the addition and conversion ROM 312 may be the nonlinear PCM code voice signal from another device from the ISDN line, and the matrix switch 40 may output the added voice signal to the analog telephone 50 belonging to the ISDN interface unit through the voice codec 37. By using the above construction, the combined voice signal may be output to the analog telephone 50.

Further, in this first embodiment, it is disclosed that the addition and conversion ROM 312 operates the add function, however, the addition and conversion ROM 312 is designated by the personal computer 70 for this add function. Therefore, the personal computer 70 may choose not to designate the addition and conversion ROM 312 for operating the add function, and the nonlinear PCM coded data from the voice codec 37 may be set at zero value (bit string of all "1" as a nonlinear PCM code) to output the added voice signal. As a result, the nonlinear PCM coded data obtained by the operation of the code conversion ROM 311 can output to the ISDN line as it is, and then, the linear PCM coded data stored in the personal computer 70 can be converted to the nonlinear PCM coded data and output to the ISDN line. In FIG. 4 the abbreviation is as follows; IN: input, SC: shift clock, LD: load, OUT: output, CLK: clock, OE: output enable.

As shown in FIG. 3, the ISDN interface unit 20 provides the communication control circuit LSI 34 executing a data link function, the V.110 circuit 35, the V.22 modem circuit 36, and the voice codec 37, and uses switches to transfer paths. In this embodiment, the communication processes are performed in accordance with the following sequence.

Namely, when transmitting, the personal computer 70 first uses a setup message designating the 64 kbps nonlinear digital data in the bearer capability and starts to process the line connection as digital communication. Then, when the response message returns through the ISDN line and starts to communicate, in accordance with the root of the communication control LSI 34, the switch 39, the V.110 circuit, the matrix switch 40, and the ISDN interface control LSI 28, and in response to the communication function of the ISDN communication, data transfer to the communication partner can be realized. On the other hand, when the communication partner does not have the digital communication function, the disconnect message is returned, thus in this case, retransmission is immediately carried out using a setup message, bearer capability of which is 3.4 kHz signal. When the response message is returned via the ISDN line in accordance with the retransmission and the communication starts, the communication for the communication partner starts in accordance with the sequence root of the communication control LSI 34, the switch 39, the V.22 modem circuit 36, the analog switch 38, the voice codec 37, the parallel/serial conversion circuit 33, the code conversion and addition ROM 31 (the code conversion and addition is not carried out), the parallel/serial conversion block 32, the matrix switch 40, and the ISDN interface control LSI 28.

Namely, the data communication to the communication partner is started by the voice band signal using the V.22 modem circuit 36 and the voice codec 37.

By using the above communication sequence, during the ISDN progressing step, the communication for the existing analog network can be carried out in accordance with a higher grade communication process.

By using this embodiment, the ISDN interface unit, by which both the data communication service and the voice communication service can be provided, is obtained.

Next, a second embodiment of the invention is explained in detail with reference to FIG. 5.

In the figure, 102 denotes a ring signal generation circuit correspondingly provided to the ISDN interface unit, 50 denotes an analog telephone connected to the ISDN interface unit. The ring signal generation circuit 102, for example, when the ISDN interface unit is mounted on a personal computer expanded board, is provided in the personal computer. 6 denotes a telephone interface, which is a hardware interface for the analog telephone 50. Further, the telephone interface 6 comprises a subscriber line interface 113 for accommodating the analog telephone 50, a relay driver controller 115, and a modular jack that has more than four poles and is connected to the analog telephone.

The relay driver controller 115 supplies an ON or OFF signal which designates or determines the generation of the ring of the analog telephone 50. The ON/OFF signal uses two poles of the modular jack 114, one of the two poles is grounded, and the signal through another pole is turned ON or OFF.

The ring signal generation circuit 102 comprises a ring signal generator 120, a relay switch 121, a modular jack 122, and a relay driver 123.

The relay switch 121 selects a ring signal from the ring signal generator 120 or a communication signal from the subscriber line interface 113 through the modular jack 114, and supplies the same to the modular jack 122 in response to the ON/OFF signal from the relay driver controller 115 through the relay driver 123.

When the relay driver controller 115 outputs the ON signal, the relay driver 123 excites or energizes the relay switch 121 to select the ring signal. When the relay driver controller 115 outputs the OFF signal, the relay switch 121 is not energized and selects the communication signal.

In the above second embodiment, when the relay driver controller 115 in the telephone interface 6 receives the designation of the connection to the analog telephone 50 from the ISDN line, the relay driver controller 115 supplies an ON signal to designate the generation of the ring of the analog telephone 50 through the modular jack 114. When the relay driver 123 receives the ON signal, the relay driver 123 excites the relay switch 121 and controls the relay switch 121 to select and output the ring signal generated by the ring signal generator 120. By this control, the 75 Vrms and 16 Hz ring signal from the ring signal generator 120 is input to the analog telephone 50, thus the analog telephone 50 produces the ring. In this embodiment, the ISDN interface is made to reduce the size thereof.

Figure 5:
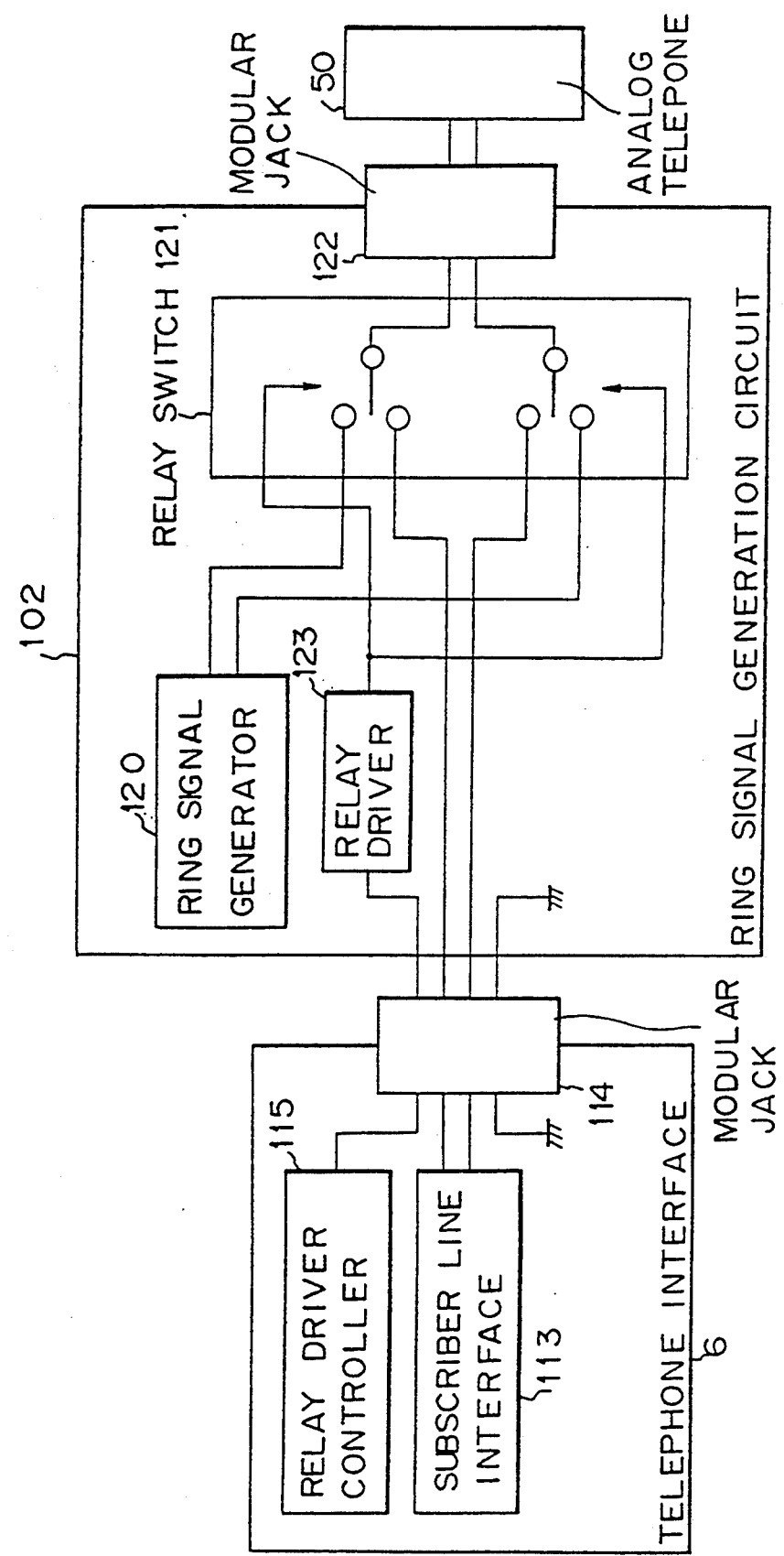
FIG. 5 is a partial block diagram of the ISDN interface unit according to a second embodiment of the invention.
Figure 6:
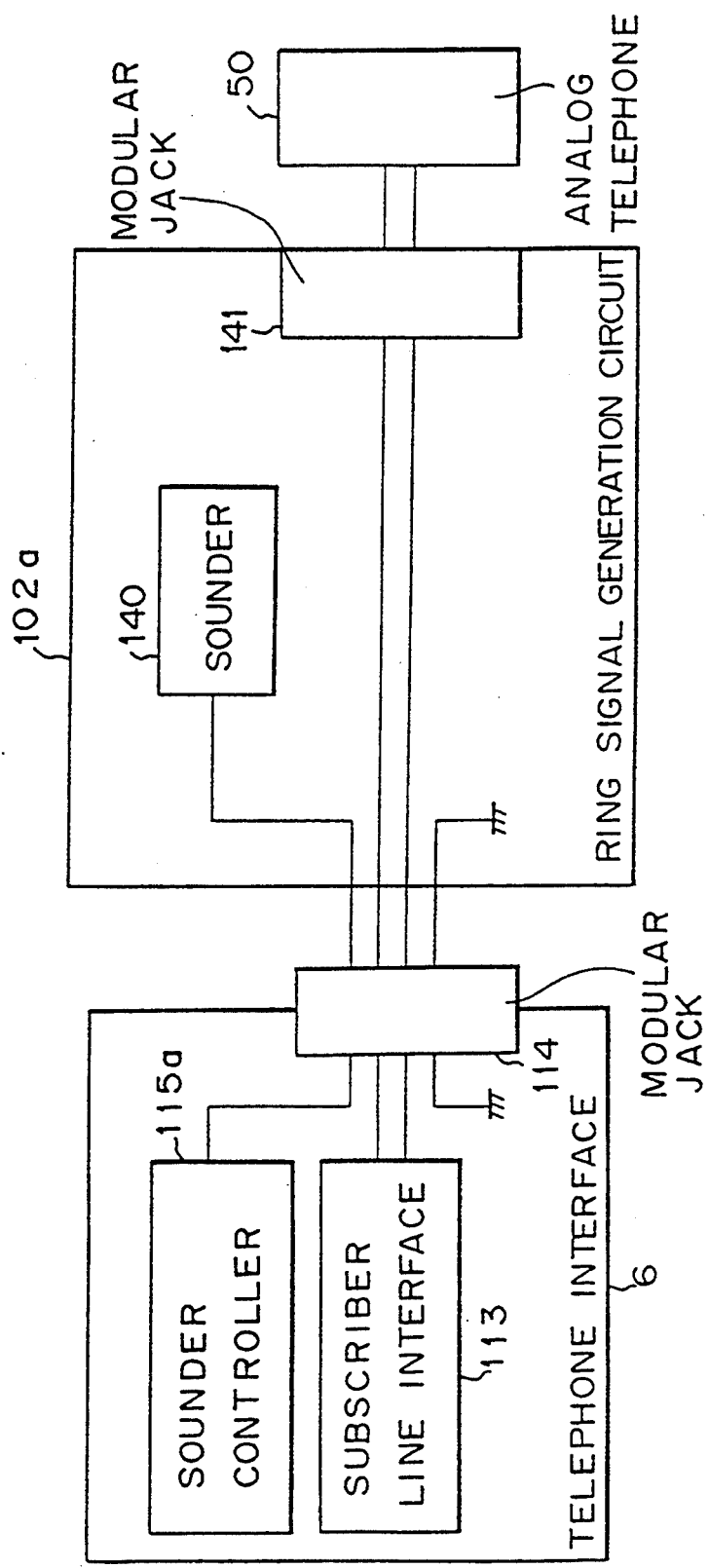
FIG. 6 is a partial block diagram of the ISDN interface unit according to a third embodiment of the invention.

In FIG. 6, a third embodiment of the invention is shown. In the figure, the same elements in FIG. 5 are shown by the same reference numerals.

In FIG. 6, 102a denotes a ring signal generation circuit that is provided corresponding to the ISDN interface unit and comprises a sounder 140 and a modular jack 141. For example, if the ISDN interface unit is provided as a personal computer expanded board, the ring signal generation circuit 102a is accommodated in the personal computer. Namely, the circuit 102a is provided corresponding to the ISDN interface unit.

The telephone interface is the same as that of in FIG. 5 except for the sounder controller 115a.

The sounder controller 115a supplies an ON/OFF signal to designate the sound generation of the sounder 140. The ON/OFF signal from the sounder controller 115a uses two poles in the modular jack, one of the two poles is grounded and another pole is supplied with an ON/OFF signal and the ON/OFF signal is output to the ring signal generation circuit 102a.

The sounder 140 generates a ring of the analog telephone 50. The communication signal from the subscriber line interface through the modular jack 114 is supplied to the analog telephone 50 through the modular jack 141.

In FIG. 6, the sounder controller 115a of the telephone interface 6 receives instructions concerning the connection to the analog telephone 50 from the ISDN, then, the sounder controller 115a supplies an ON signal designating the generation of the ring sound of the analog telephone 50 through the modular jack 114. The sounder 140 receives the ON signal, then the sounder 140 generates a ring similar to the ring of the analog telephone 50.

By using this third embodiment, a small ISDN interface unit is maintained and the same ring of the connected analog telephone 50 can be obtained.

We claim:

1. An integrated services digital network (ISDN) interface unit, connected to an ISDN line and a data processing unit having a memory, for interfacing between the data processing unit and the ISDN line, said interface unit comprising:
   a clock generating a clock signal;
   a DMA request signal generation circuit connected to the ISDN line by way of an ISDN connection circuit and generating direct memory access (DMA) request signals from the clock signal received from the clock to access the memory of the data processing unit; and
   means for transferring one of pulse coded modulation (PCM) coded data from the ISDN line to the memory of the data processing unit and PCM coded data stored in the memory of the data processing unit from the memory to the ISDN line, in accordance with the DMA request signals generated by the DMA request signal generation circuit.

2. An integrated services digital network (ISDN) interface unit, connected to an ISDN line and a data processing unit having a memory, for interfacing between the data processing unit and the ISDN line, said interface unit comprising:
   a clock generating a clock signal;
   a DMA request signal generation circuit connected to the ISDN line by way of an ISDN connection circuit and generating direct memory access (DMA) request signals from the clock signal received from the clock to access the memory of the data processing unit;
   means for transferring one of pulse coded modulation (PCM) coded data from the ISDN to the memory of the data processing unit and PCM coded data stored in the memory of the data processing unit from the memory to the ISDN, in accordance with the DMA request signals generated by the DMA request signal generation circuit;
   an ISDN connection circuit connected to the ISDN line and executing a physical interface with the ISDN line, and when said ISDN connection circuit receives a digital signal from the ISDN line, said ISDN connection circuit processes the digital signal into a 64 kbps information channel signal including at least one of a voice signal, data information and a control channel signal;
   an ISDN connection control circuit, connected to said ISDN connection circuit and extracting and interpreting an ISDN connecting control message from the digital signal processed by and received from said ISDN connection circuit; and
   a personal computer interface circuit, connected to said ISDN connection control circuit and said DMA request signal generation circuit for executing an interface between the data processing unit and the integrated services digital network interface unit.

* * * * *